United States Patent
Post et al.

(10) Patent No.: US 6,729,763 B2
(45) Date of Patent: May 4, 2004

(54) HYBRID BEARING SYSTEM

(75) Inventors: Jeffrey M. Post, South Windsor, CT (US); Jan Krakowski, Bloomfield, CT (US); Mathew Mormino, Jr., Windsor Locks, CT (US); Bruce B. Yurczak, Rocky Hill, CT (US)

(73) Assignee: Kamatics Corporation, Bloomfield, CT (US)

( * ) Notice: Subject to any disclaimer, the term of this patent is extended or adjusted under 35 U.S.C. 154(b) by 4 days.

(21) Appl. No.: 10/210,793

(22) Filed: Jul. 31, 2002

(65) Prior Publication Data

US 2003/0095729 A1 May 22, 2003

Related U.S. Application Data (60) Provisional application No. 60/332,820, filed on Nov. 16, 2001.

(51) Int. Cl.[7] ............................................. F16C 23/04
(52) U.S. Cl. ..................... 384/213; 384/291; 384/292; 384/298; 384/300; 384/912
(58) Field of Search .................. 384/145, 146, 384/206, 208, 213, 214, 291, 292, 298, 300, 912

(56) References Cited

U.S. PATENT DOCUMENTS

| | | | |
|---|---|---|---|
| 4,597,676 A | 7/1986 | Vohr et al. | ................... 384/114 |
| 5,328,273 A | * 7/1994 | Nonaka et al. | ............. 384/206 |
| 5,348,401 A | 9/1994 | Justak et al. | ................. 384/101 |
| 5,964,325 A | * 10/1999 | Davison et al. | ............. 384/152 |

FOREIGN PATENT DOCUMENTS

| | | |
|---|---|---|
| GB | 1404048 | 10/1972 |
| JP | 55094020 A | 7/1980 |
| JP | 5332359 A | 12/1993 |
| WO | WO 97/29291 | 8/1997 |
| WO | WO 01/53711 A1 | 7/2001 |

\* cited by examiner

*Primary Examiner*—Lenard A. Footland
(74) *Attorney, Agent, or Firm*—Cantor Colburn LLP (57) ABSTRACT

A hybrid bearing system that has a self-lubricating portion and a grease lubricated portion each being disposed on the same surface, the system is adapted to accommodate at least two distinct wearing forces generated by different types of motions. The bearing system includes: a first member; a second member, the second member being configured to be rotatably received within the first member; a self lubricating machineable liner system disposed between the first member and the second member; a receiving area disposed on the self lubricating liner system and a portion of either the first or the second member; and a lubrication opening in fluid communication with the receiving area, the lubrication opening providing structure for disbursing a lubrication grease within the receiving area.

25 Claims, 7 Drawing Sheets

HYBRID BEARING SYSTEM

CROSS REFERENCE TO RELATED APPLICATION

This application claims the benefit of U.S. Provisional application Ser. No. 60/332,820, filed Nov. 16, 2001, the contents of which are incorporated herein by reference thereto.

TECHNICAL FIELD

The present application relates to bearing assemblies and, more particularly, a hybrid bearing system that employs both a lubricating means and a self-lubricating means.

BACKGROUND

Bearings that allow rotation and misalignment have been and are used at the ends of actuators which move flight controls in aircraft applications. An example of flight controls includes, but is not limited to the following control surfaces in an aircraft: ailerons, rudders, elevators, elevons, ruddevons, flaperons, etc.

As the technology used in modern jet fighter aircraft and commercial aircraft has improved, the bearings used in these flight control actuator systems encounter different types of motions. In particular, the actuator systems encounter large types of motions and small constant or continuous dithering types of motions.

For example, most modern aircraft are designed with "fly-by-wire" or "fly-by-light" active flight control systems. In these types of flight control systems high speed computers respond to minute changes in aircraft speed and attitude and the flight controls are continually actuated as the flight control systems continually "hunts" to find the proper position that the flight control should be at. The net effect of this operation is that the bearings associated with or connected to the ends of the flight control actuators are subject to very small and continuous dithering motions.

These motions are in addition to large motions that are a result of control input from the pilot (e.g. a large motions) which provides other areas of wear not associated with the small and continuous dithering motions mentioned above.

Many types and styles of bearings have been used in these flight control applications with marginal results normally resulting in premature removal of the bearing from aircraft service and increased maintenance costs and manpower which in turn increase the direct operating cost of the aircraft.

Two types of bearings systems have evolved, self-lubricating bearings and lubricating (e.g. grease) bearings or grease lubricated or dry film lubricated metal-to-metal bearings.

Self-lubricating bearings including fabric bearings and molded composite liner bearings that are designed to wear throughout their operational life or alternatively be used in an application where there is little movement or wear. Accordingly, the life of a fabric bearing or molded liner bearing depends on the application and the amount of wear that accumulates during use. In particular, and in aircraft applications where the bearing may encounter a large motions primarily due to larger flight control motions the bearing encounters greater wear that is a result of pilot control input.

Grease lubricated or dry film lubricated metal-to-metal bearings are characterized by having metal components which are grease lubricated or dry film lubricated. In a roller bearing, steel rolling elements are used which roll between two (2) other metal surfaces, for a metal-to-metal bearing two metal components slide relative to each other. In these bearings either grease or a dry film lubricant is used to lubricate the metallic surfaces. Theses bearing are not particularly well suited for very small dithering motions that are prevalent in an active "fly-by-wire" and "fly-by-light" systems. The very small motions do not supply adequate oscillation of the bearing to distribute the grease and as a result the bearings can experience brinelling, fretting, seizure or bearing failure. In addition, these very small dithering type motions also cause the grease or dry film lubricant to migrate from the bearing metal-to-metal contact zone.

In addition, metal bearings are also commonly made of high hardness, non-corrosion resistant metals or metals that have been nitrided or malcomized which further reduces their corrosion resistance. Accordingly, corrosion coupled with inadequate lubrication a potential by-product of the very small dithering motions that does not adequately distribute the grease leads to brinelling, fretting, corrosion, seizure, or bearing failure.

Both the self-lubricating and grease lubricated bearings perform well with primarily one type of motion or in a particular type of application. The self-lubricating bearing works best with very small type dithering or vibrational motion while the grease lubricated bearing is designed to operate with large motions in which the grease is redistributed via the large motions (oscillations) in the bearing.

SUMMARY

A hybrid bearing system that comprises a self-lubricating portion and grease lubricated portion disposed on the same surface, the system is adapted to accommodate at least two distinct wearing mechanisms generated by different types of motions.

A bearing system, comprising: a first member; a second member being configured to be rotatably received within the first member; a self lubricating machineable liner system disposed between the first member and the second member; a receiving area disposed on the self lubricating liner system and a portion of either the first or the second member; and a lubrication opening in fluid communication with the receiving area, the lubrication opening providing a means for disbursing a lubrication grease within the receiving area.

The above-described and other features of the present disclosure will be appreciated and understood by those skilled in the art from the following detailed description, drawings, and appended claims.

DETAILED DESCRIPTION

A hybrid bearing system that uses a combination of materials and construction practices to create a superior life bearing system for use in applications having a certain type of motion spectrum. In particular, the motion spectrum includes forces and motions encountered in flight control actuators of aircraft systems. The hybrid bearing system includes and utilizes a self-lubricating liner system and a lubricant positioned to provide a means of additional lubrication between two movable members one of which is configured to have the self lubricating bearing surface disposed thereon.

The hybrid bearing system provides lubrication or friction reducing capabilities for a wide range of motions with respect to the two movable members. The hybrid bearing system is capable of accommodating a broad range or large oscillation motions through the use of a lubricating grease while additionally accommodating very small dithering or vibrational movements through the use of a self lubricating system.

Figure 1:
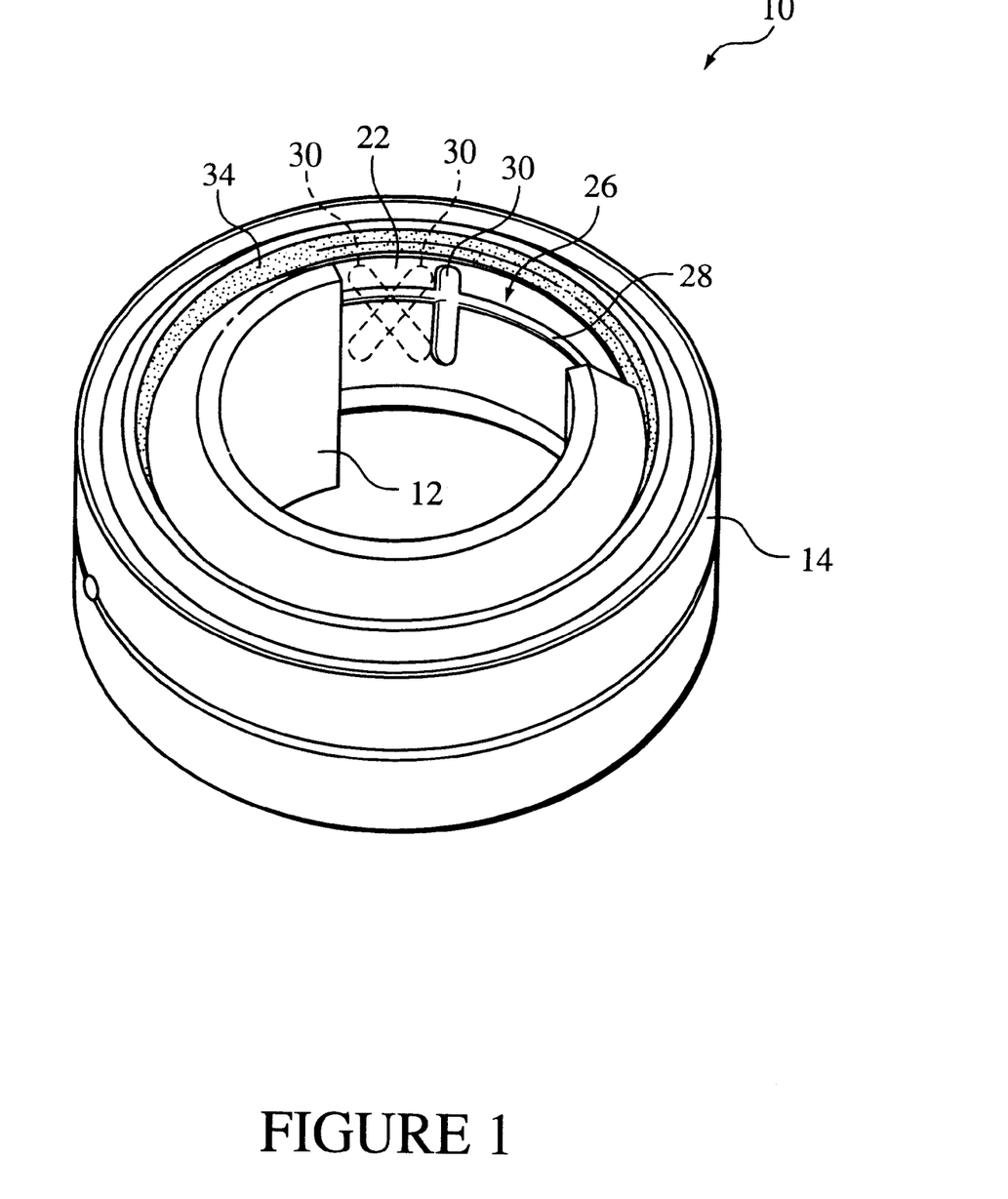
FIG. 1 is a perspective view with a cut away of a hybrid bearing constructed in accordance with an exemplary embodiment.
Figure 2:
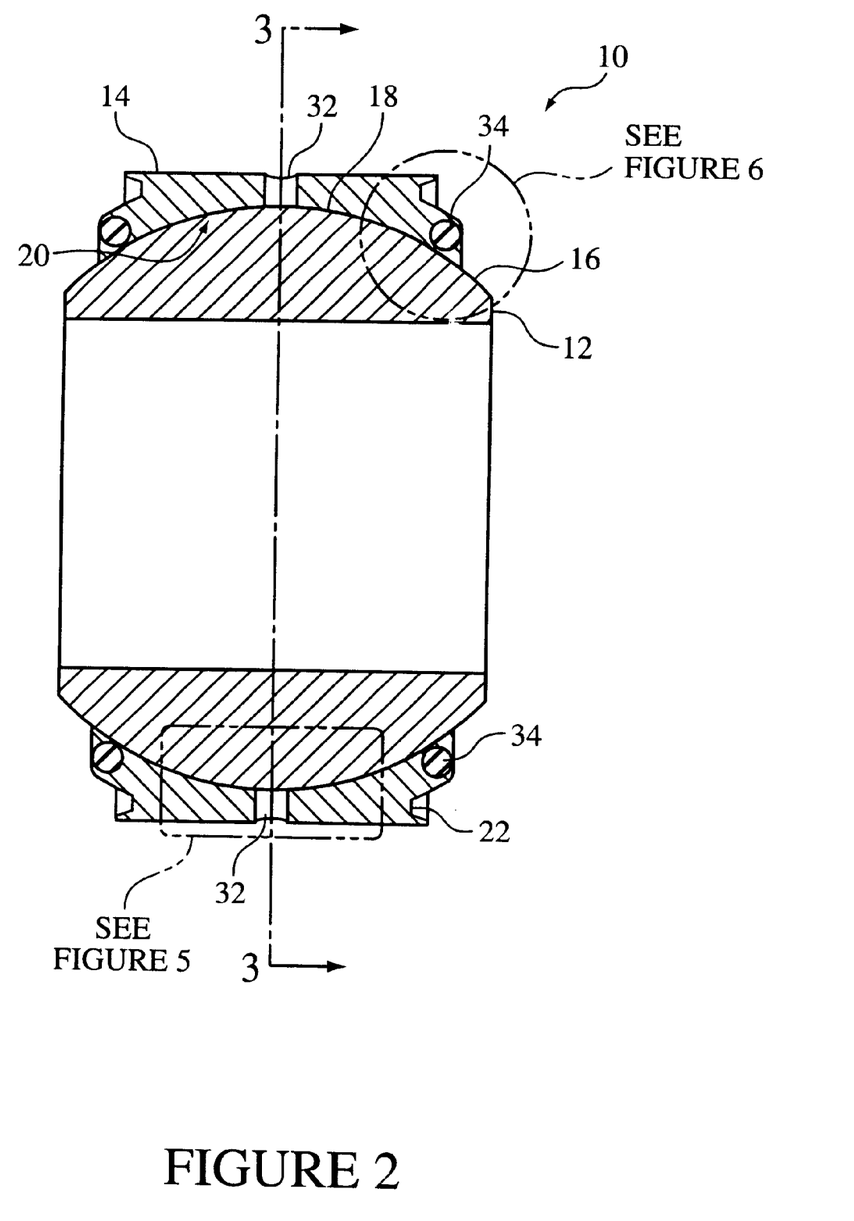
FIG. 2 is a cross sectional view of a hybrid bearing constructed in accordance with an exemplary embodiment.
Figure 3:
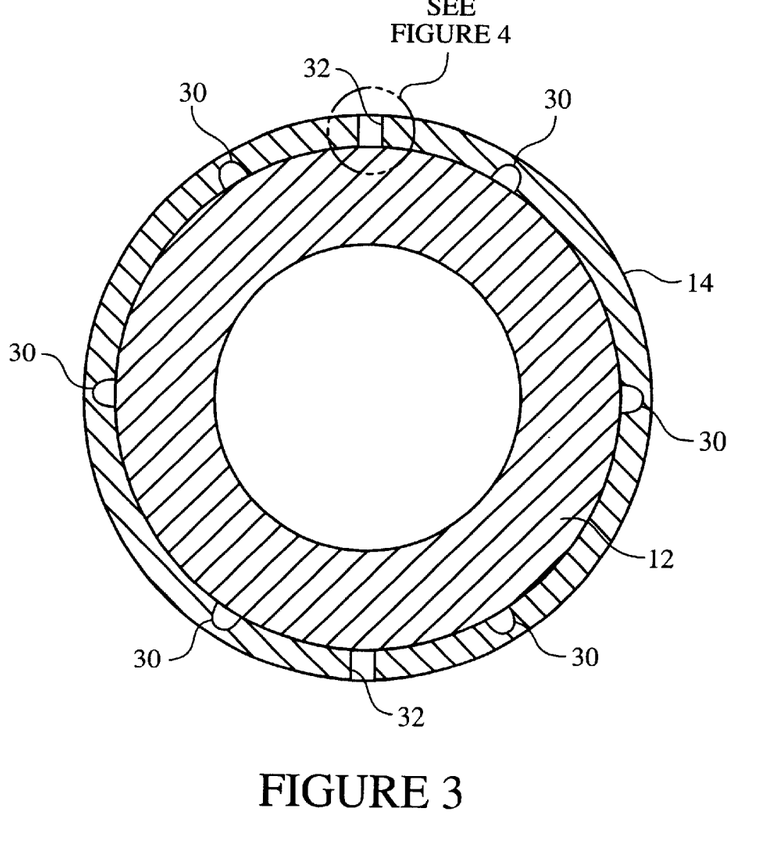
FIG. 3 is a view along lines 3—3 of FIG. 2.
Figure 4:
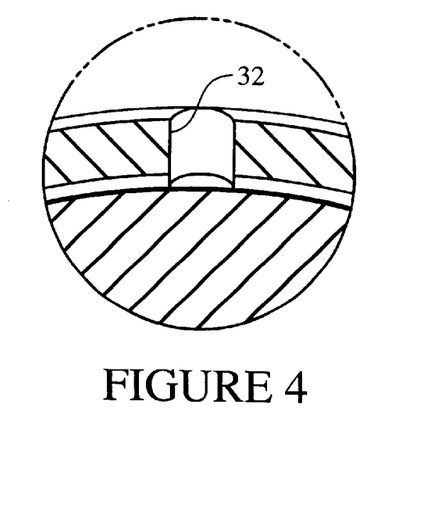
FIG. 4 is an enlarged view of a portion of FIG. 3.
Figure 5:
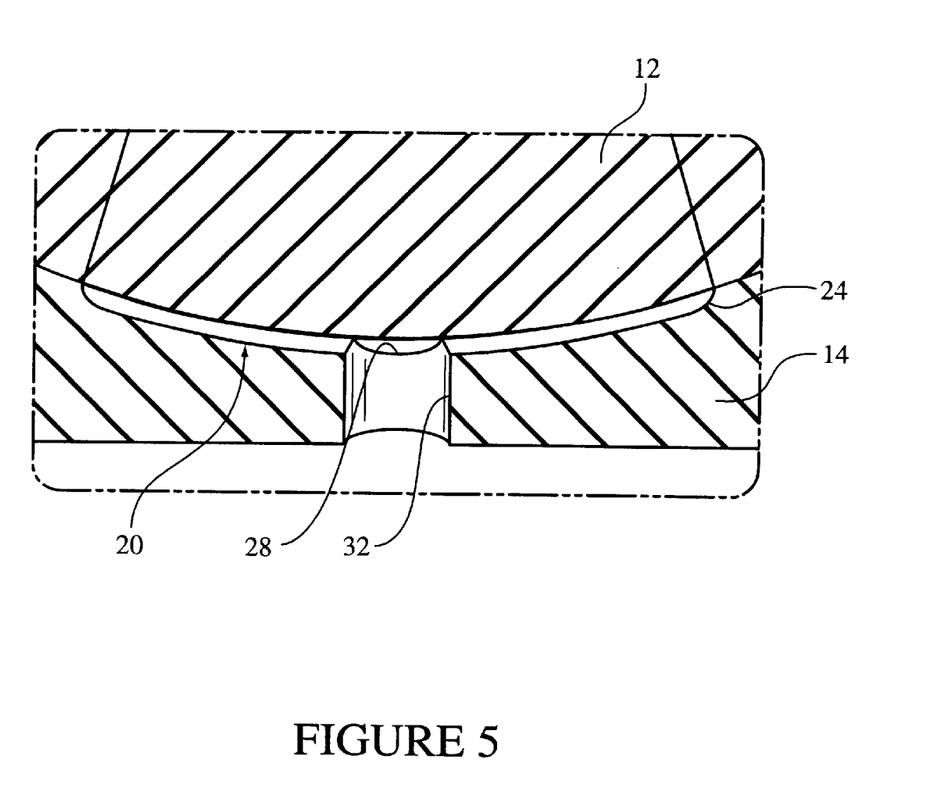
FIG. 5 is an enlarged view of a portion of FIG. 2.

Referring now to FIGS. 1 and 2, a hybrid bearing system 10 constructed in accordance with an exemplary embodiment is illustrated. In an embodiment, hybrid bearing system 10 is a spherical bearing having a spherical ball inner race member 12 and an outer race member 14. The spherical bearing depicted in the Figures is intended to provide an example of the hybrid bearing system and the application of the present application is not intended to be limited to spherical bearing applications. For example, and to provide just a few alternatives, the hybrid bearing system is capable of being applied to a journal sleeve or flanged bushing configuration.

Inner race member 12 is spherical ball manufactured out of a corrosive resistant metal. The metal used for the spherical ball consists of, but is not limited to, beryllium copper, aluminum nickel bronze, aluminum bronze, copper nickel tin, copper, brass, spinoidal bronze, corrosion resistant steel/stainless steel, aluminum, nickel, titanium, inconel, and plasma sprayed/high velocity oxy fuel (HVOF) coatings such as chrome oxide, chrome carbide, titanium nitride, tungsten carbide, tungsten carbide cobalt, etc., or hard chrome plating over metallic materials.

Inner race member 12 has an outer diameter or outer surface portion 16 that is configured to be rotatably received within an inner opening 18 of outer race member 14. Inner race member 12 includes an inner opening configured for receipt of a shaft of an actuator (not shown). Inner opening 18 as will be discussed more fully herein is provided with a complimentary surface configuration to facilitate the rotation of inner race member therein.

Outer race member 14 is also manufactured from a corrosive resistant material. Materials for the outer race consist of, but are not limited to beryllium copper, aluminum nickel bronze, aluminum bronze, copper nickel tin, copper, brass, and spinoidal bronze, corrosion resistant steel/stainless steel, aluminum, nickel, titanium, inconel. The preferred metals are corrosion resistant and are selected for their resistance to galvanic corrosion.

A fabric or molded liner system 20 is positioned between the adjacent surfaces of inner race member 12 and outer race member 14.

In an embodiment, liner system 20 is a fabric composite self lubricating bearing material that is constructed from PTFE or TEFLON® fabric 22 that is woven with other fabric fillers such as, but not limited to DACRON®, polyester, fiberglass, cotton, NOMEX®, KEVLAR® etc. The fabric and DACRON fabric fillers are bonded to a metallic substrate material of either the inner race member or the outer race member to form a composite matrix through the use of a suitable adhesive comprising a polyester, epoxy, phenolic, urethane, polyimide or other type of suitable resin system. The resin system also encapsulates the lubricant of the PTFE or TEFLON® fabric.

Alternatively, liner system 20 is a PTFE or TEFLON® self lubricating molded composite liner system which is comprised of lubricating fibers including PTFE or TEFLON® fibers, and/or graphite and other types of special fillers in a composite polyester, epoxy, phenolic, urethane, polyimide or other type of suitable resin system. The self-lubricating composite liner system is one embodiment is molded into its preferred location.

The resin based adhesive bonding or either the fabric or composite liner system lends itself to a liner system that can be machined or can be molded or injected into the bearing. In accordance with an exemplary embodiment where the self-lubricating liner needs to be machineable; the combination of the resins, PTFE and fillers allows the cured liner system to be machined. Accordingly, and in accordance with an exemplary embodiment liner system 20 is characterized by its ability to be machined. As will be discussed in more detail below, liner system 20 and the surface it is adhered to is machined to have a plurality of grease lubricating paths.

The liner system is adhered to the inner surface of outer race member 14 or alternatively the outside diameter of the inner race member. Accordingly, the surface or liner that contains the self-lubricating material is capable of being moved to either component of the bearing. Specifically, and referring to a spherical bearing, the self-lubricating material and grease paths could be installed on the outer diameter of the ball instead of the inner diameter of the outer race.

For a journal sleeve or flanged bushing configuration, the self-lubricating liner material and grease paths could be installed on the outer diameter of the shaft instead of on the inner diameter of the bushing.

The fabric bearing or molded liner bearing system would range in thickness from 0.003 to 0.030 inches thick and is adhesively bonded to the metallic substrate of either the inner or outer race. The adhesive bond prevents the self-lubricating liner from migrating out of the primary bearing wear zone due to very small dithering motion or vibration encountered by the bearing. Of course, and as applications may require, the thickness of the liner material may be greater or less than the aforementioned ranges.

The adhesive bond is supplied by a resin-based system as enumerated above. The resin based system used to form the self-lubricating composite matrix ranges in temperature capability from −100° F. to +600° F. Of course, and as applications may require, the temperature capability of the resin based system may be greater or less than the aforementioned ranges.

The fabric bearing or molded liner bearing system provides the necessary lubrication for the constant level of very small dithering motions. The encapsulation of the lubricant in a composite resin matrix prevents the lubricant (PTFE, TEFLON®, or graphite) from migrating out of the wear zone due to dithering or vibratory motion. Dithering type motion is as used herein is motions caused by the continual "hunting" by the flight control to find the proper position in an active "fly-by-wire" or "fly-by-light" control system.

In addition, and an accordance with an embodiment, an engagement surface 24 of the liner system is positioned to make contact with either the inner surface of the outer race member or alternatively the outer surface of the inner race member depending on which member liner system 20 is adhered to.

Engagement surface 24 through the use of liner system 20 provides a self-lubricating means adequate for small dithering motions between inner race member 12 and outer race member 14. The self lubricating means of liner system 20 provides a means for lubricating or working with a first type of movement, namely very small type dithering or vibrational motions.

Once the resin based liner system has been cured engagement surface 24 is machined, injected, molded or bonded in place to provide predetermined tolerances (e.g. suitable to facilitate movement between the two surfaces).

Engagement surface 24 and a portion of the surface of which the liner system is adhered to is machined to have lubricating paths 26 for providing a recessed area for receiving and maintaining an amount of bearing grease. A type of contemplated bearing grease includes, but is not limited to the following: mineral based grease, synthetic grease, or a hybrid mineral/synthetic grease.

The lubricating paths are machined into the engagement surface of the liner system after the liner system is applied to either the inner or outer race member and prior to the insertion of the inner race member within the outer race member. The lubricating paths provide localized areas for receipt of a lubricating grease which conforms with paths of movement of inner and outer race members with respect to each other.

These lubricating paths provide a lubricating means for large motions (e.g. larger than dithering motions) encountered by the bearing system which supplement the PTFE or TEFLON fabric or molded self lubricating liner system. These motions are typically encountered pilot control input for manipulating the aircraft flight control actuators.

In an embodiment of the present application the lubricating paths include a first lubricating path 28 and a plurality of second lubricating paths 30. First lubricating path 28 traverses completely around engagement surface 24 in a circular or arcuate path. First lubricating path 28 provides a means for lubrication as inner race member 12 rotates in a first plane with respect to outer race member 14 (e.g. in a direction substantially parallel to first lubricating path 28).

In addition, second lubricating paths 30 traverse first lubricating path 28 in an orthogonal arrangement. Second lubricating paths 30 are positioned to provide lubrication in directions out of line with respect to the rotational movement of the inner race with respect to the outer race. Of course, other configurations and angular arrangements of first lubricating path 28 and second lubricating paths 30 are contemplated in accordance with the present disclosure. For example, and referring to the dashed lines in FIG. 1, second lubricating paths 30 are capable of being machined in an angular arrangement and can include multiple pairs of lubricating paths 30.

Figure 9:
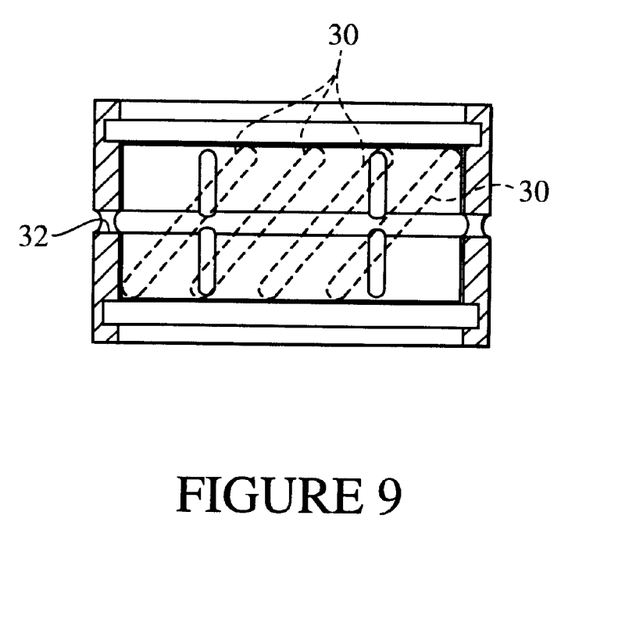
FIG. 9 is a view along lines 9—9 of FIG. 8.
Figure 10:
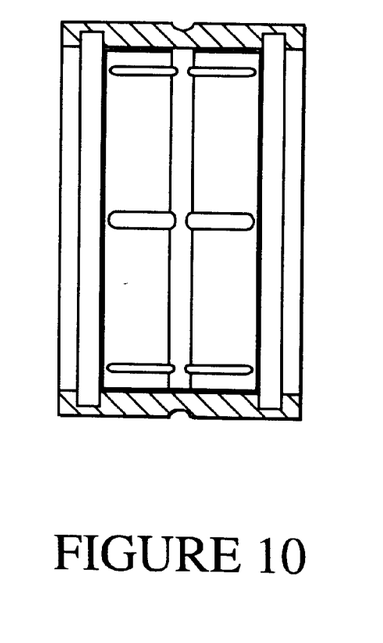
FIG. 10 is a view along lines 10—10 of FIG. 8.

As yet another alternative, and referring to the dashed lines in FIG. 9, a plurality of diagonal or spiral paths 30 are machined into the surface of the liner system.

Second lubricating paths 30 provide a means of lubrication as inner race member 12 rotates in a second plane with respect to outer race member 14. It is contemplated that the first and second planes are generally orthogonal with respect to each other. In yet another example, the first plane of movement relates to be desired rotation of the bearing while the second plane of movement relates to movement out of the first plane. Of course, and as stated earlier the configurations and/or angular arrangements of the first and second planes may vary.

The number of second lubricating paths 30 may vary for example, and depending on the diameter of the bearing there may be a different amount of paths. For example, in a bearing system having ½ inch diameter there could be four second lubricating paths 30. Of course, and as applications may require, the number of paths may vary. The placement of second lubricating paths 30 are preferably located in an equidistant manner, for example, if as in the example of four paths 30 they would be positioned on engagement surface 24 approximately 90 degrees apart from each other. Alternatively, they can be 60 degrees apart from each other with an appropriate number of paths (e.g., six paths). Of course, other combinations of paths and distances (e.g., degrees) apart from each other are contemplated for use with the present disclosure.

Again, the placement and arrangement of paths 30 may also vary. Accordingly, the bearing grease and paths 28 and 30 are disposed between the adjacent surfaces of liner system 20 and outer surface of inner race member 12 or alternatively the inner surface of outer race member 14.

At least one lubrication opening 32 is cross-drilled through outer race member 14 or alternatively through the spherical ball until it is at a depth that is reached when the grease paths are machined through the liner system into the bearing race. Thus, and after the paths are machined they are in fluid communication with the lubricating opening. Lubrication opening 32 allows a lubricating grease to be applied into the receiving areas of paths 28 and 30. Lubrication opening 32 allows the lubricating grease to be applied after the bearing system has been assembled in addition to replenishing the bearing system during the operational lifetime of the same. In addition, and in order to maintain the lubricant within the lubricating paths, a grease fitting or other means for providing one way fluid communication into the lubricating paths is provided.

Figure 6:
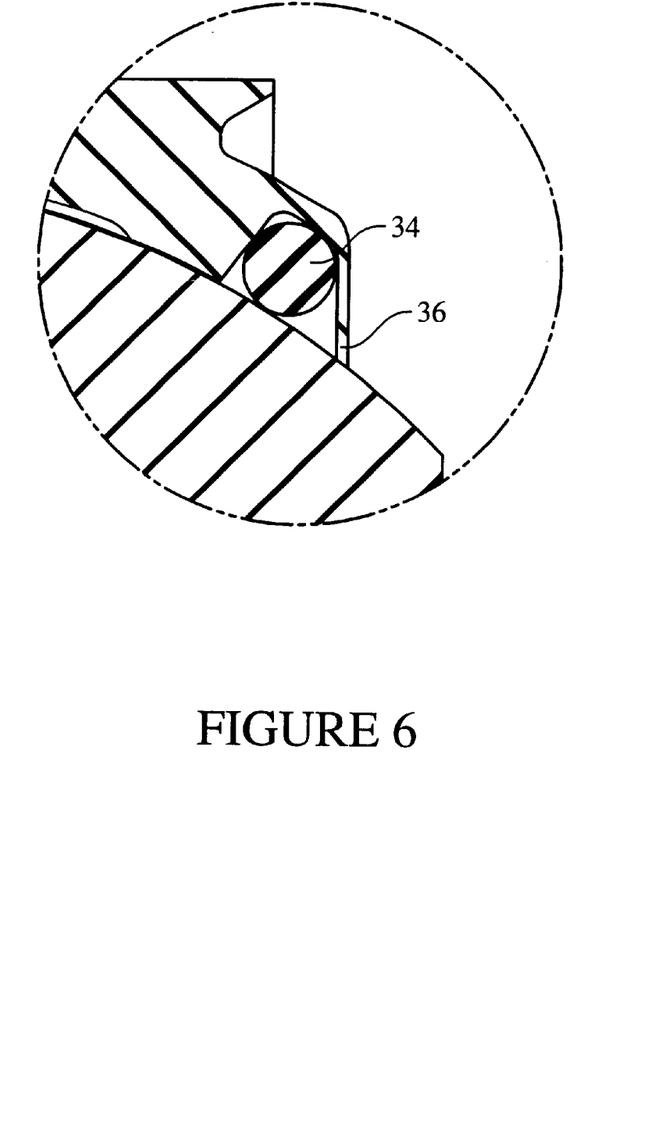
FIG. 6 is an enlarged view of a portion of FIG. 2.
Figure 7:
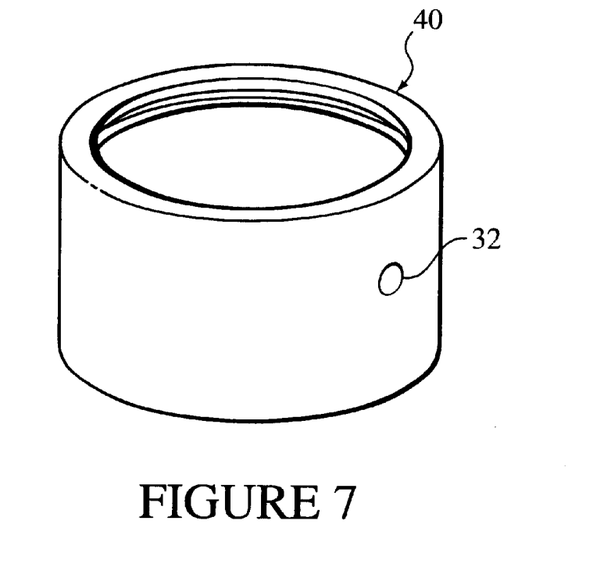
FIG. 7 is a perspective view of a portion of a hybrid bearing system.
Figure 8:
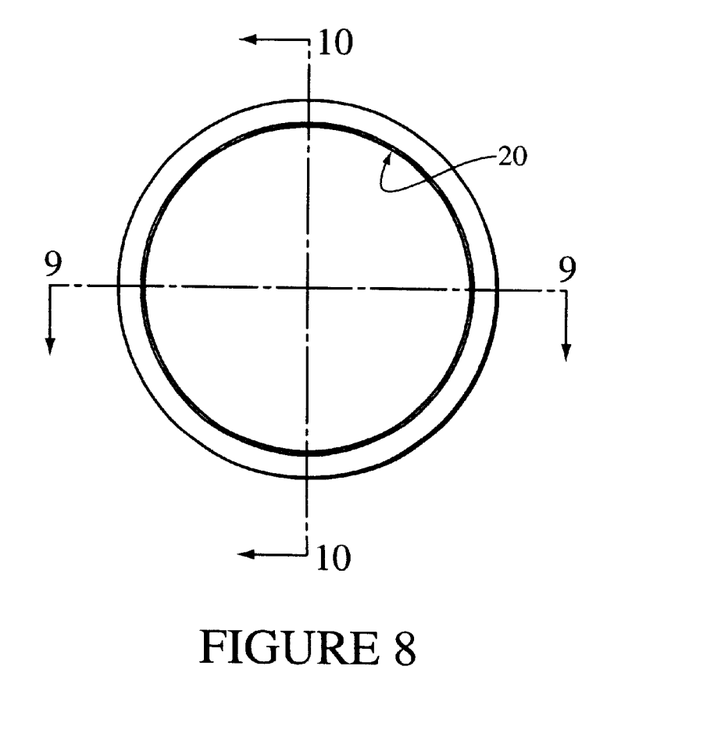
FIG. 8 is an end view of a bushing with the hybrid bearing system of the present disclosure.

Referring now to FIGS. 2 and 6, a sealing means in form of a pair of sealing members or seals 34 are positioned along the outer periphery of outer race member 14. Seals 34 seal the contact surfaces of inner race member 12 and outer race member 14. Seals 34 prevent the lubricating grease of paths 28 and 30 from migrating out of its preferred location (e.g. between engagement surface 24 and its opposing surface of the hybrid bearing system). In addition, seals 34 prevent debris from entering into this location.

Once seals 34 are positioned in their preferred location, a retaining member 36 is positioned to retain seals 34 in their sealing position. In an exemplary embodiment, retaining member 36 is portion of outer race member 14 that is molded over seal 34. Seals 34 are selected or designed to provide a low friction seal so as to not interfere with the movement of the inner race member with respect to the outer race member.

One contemplated material for providing the sealing means is an O-ring, alternative means for sealing the lubricating grease from migrating out of its preferred location depend in part on the geometry of the bearing system. One example of an alternative means includes an injection molded plastic or composite component. An example of another sealing method is as disclosed in U.S. Pat. No. 4,060,287 the contents of which are incorporated herein by reference thereto. In accordance with the present disclosure and referring now to FIGS. 1–7, the hybrid bearing system for a spherical bearing system of the present disclosure can be constructed in one of the following methods. The liner may be installed by injection, molding, bonding or applying then machining (multi-piece outer race) For example, the liner and its adhesive can be applied in one of the manners/methods outlined in U.S. Pat. Nos. 3,806,216, 4,048,370, 4,108,505 and 4,717,268, the contents of each of which are incorporated herein by reference thereto. The aforementioned patents are provided to provide examples of methods of applying the liner and are not intended to limit the present disclosure to the same.

Once the resin based liner system has cured its exposed surface is machined, if necessary, to a tolerance for providing a suitable surface finish, or alternatively the liner may be injected or molded to its finished shape thereby not requiring a machining step for the surface finish.

After the machining process of engagement surface 24 or other methodology in which liner system is positioned between the two movable members of the hybrid bearing system, the lubrication paths are machined into the engagement surface of the resin based liner system. The lubrication paths are machined to a depth sufficient enough to receive and retain a quantity of lubricating grease. In addition, the depth of the lubrication path(s) is/are normally greater than the thickness of the liner system and accordingly, a portion of the race member is also machined.

The race member is also machined to a sufficient depth to provide fluid communication with the lubrication opening drilled therein. Lubrication opening 32 is pre-drilled to a depth that is interconnected with the lubricating paths once they are machined into the surface of the race member. Accordingly, and in this manner, lubrication opening 32 will not interfere with the application process of the resin based liner system.

Once the lubricating paths have been machined into the engagement surface of the liner system and a portion of the race member to which it is adhered, the inner race member is positioned with the outer race and the bearing is assembled.

In one embodiment, the inner race is inserted into a cylindrical member 40 which will ultimately become outer race member 14. Cylindrical member 40 has an inner diameter large enough to allow inner race member 12 to be inserted therein. Once inner race member 12 is inserted into cylindrical member 40 the same is inserted within a die for applying a force to form the outer race about the inner race. In particular, the inner surface of cylindrical member 40 is manipulated to have the angular configuration of the inner race member as illustrated in FIGS. 1, 2, 5 and 6.

In another embodiment, the outer race is formed about the inner race member with a predetermined tolerance therebetween and the liner system is injection molded into the gap between the inner and outer race. In this embodiment either the inner or outer race is configured with openings for injection of the liner system as well as an opening for supplying the lubricating grease.

In yet another embodiment, the liner system (either fabric or composite) is applied the outside diameter of the inner race, the lubricating paths are machined therein and a two-piece outer race is formed about the inner race using a securement or welding method as disclosed in U.S. Pat. No. 4,108,505 or 4,033,019 the contents of which are incorporated herein by reference thereto.

Accordingly, and after the inner race is rotatably received and retained within outer race member 14. The sealing means in the form of seals 34 and alternatives thereof are positioned about inner race member 12 either before or after the aforementioned forming processes. If the sealing means are applied before the forming process, the forming process can be used to retain the sealing means in their preferred location (e.g. forming retaining portion 36). Alternatively, a separate forming process may be used to retain the sealing means in its preferred location.

The combination of two bearing lubrication systems provides the hybrid bearing system with an ability to endure differing types or ranges of movement. The grease lubricant backed up by a PTFE, Teflon and/or graphite lubricant fabric or PTFE, Teflon, and/or graphite molded system enables low wear rates while accommodating high bearing oscillation surface travel distance from large motions from pilot control inputs.

The use of a self-lubricating fabric bearing or molded liner bearing system combined with a mineral based, synthetic or hybrid mineral/synthetic grease to provide superior life for aerospace applications such as flight control bearings which exhibit a unique spectrum of large motions over the bearing's lifetime and also continuous very small dithering type motions.

Other types of applications would be in landing gear bearings for aircraft applications. In this application, the deployment and stowing of the landing gear relates to large ranges of motion while vibrational movement relates to smaller ranges of motion. Another application is a journal sleeve or flanged bushing configuration where a fabric bearing or molded liner bearing system is fabricated along with grease paths and a suitable mineral, synthetic, or hybrid mineral/synthetic grease. The mating surface in this application is a shaft that is inserted into the bushing. The materials for the bushing substrate would be the same as that described for the outer race of the spherical bearing as described above. The materials for the shaft are as described for the ball of the spherical bearing as described above.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A bearing system comprising:
   a first member;
   a second member being configured to be rotatably received within said first member;
   a self lubricating machineable liner system disposed between said first member and said second member;
   a channel disposed on said self lubricating liner system and a portion of either said first member or said second member; and
   a lubrication opening in fluid communication with said channel, said lubrication opening providing a means for disbursing a lubrication grease within said channel.

2. The bearing system as in claim 1, wherein said bearing system is a spherical bearing.

3. The bearing system as in claim 2, wherein said second member is a spherical inner race member and said first member is an outer race member.

4. The bearing system as in claim 3, wherein said spherical inner race member and said outer race member are constructed out of a non-corrosive metal and said liner system is adhesively bonded to either race member.

5. The bearing system as in claim 4, wherein the liner system is a fabric composite self-lubricating bearing material woven with fillers and is adhesively bonded to either said inner race or said outer race by a resin.

6. The bearing system as in claim 5, wherein said fabric is PTFE.

7. The bearing system as in claim 4, wherein the liner system is a composite material comprised of lubricating fibers and filler materials in a composite resin system.

8. The bearing system as in claim 7, wherein the composite material is molded onto its bearing surface.

9. A hybrid bearing system comprising:
   a first member;
   a second member being configured to be rotatably received within said first member;
   a first means for reducing friction between said first member and said second member;
   a second means for reducing friction between said first member and said second member said second means for reducing friction being disposed on a portion of said first means for reducing friction and a portion of either said first member or said second member; and
   a lubrication opening in fluid communication with said second means for reduction friction.

10. The hybrid bearing system as in claim 9, wherein said system is configured for use as a bearing in a movable vehicle component capable of large ranges of motion as well as small vibration ranges of movement.

11. The hybrid bearing system as in claim 10, wherein said first means for reducing friction is adapted for said small vibration ranges of movement.

12. The hybrid bearing system as in claim 11, wherein said vehicle is an aircraft and said movable component is a portion of a landing gear.

13. The hybrid bearing system as in claim 11, wherein said first lubricating means is self lubricating and said second lubricating means includes a quantity of lubricating oil, said quantity of oil being capable of being replenished by said lubrication opening.

14. The hybrid bearing system as in claim 11, wherein said first lubricating means is self lubricating and said second lubricating means includes a quantity of lubricating oil, said quantity of oil being capable of being replenished by said lubrication opening.

15. The hybrid bearing system as in claim 9, wherein said first lubricating means is self lubricating and said second lubricating means includes a quantity of lubricating oil, said quantity of oil being capable of being replenished by said lubrication opening.

16. The hybrid bearing system as in claim 9, wherein said bearing system is a spherical bearing and said second member is a spherical inner race member and said first member is an outer race member each being constructed out of a non-corrosive metal and said first lubricating means is adhesively bonded to either race member.

17. A bearing comprising:
    a first member;
    a second member being configured to be rotatably received within said first member;
    a self lubricating machineable liner being adhered to either said first member or said second member, said self lubricating machineable liner being disposed between said first member and said second member;
    a first channel disposed in said self lubricating liner and a portion of either said first member or said second member;
    a second channel disposed in said self lubricating liner and a portion of either said first member or said second member; and
    a lubrication opening in fluid communication with either said first channel or said second channel, said lubrication opening providing a means for disbursing a lubrication grease within said first channel and said second channel.

18. The bearing as in claim 17, wherein said first member is an outer race of a spherical bearing and said second member is an inner race, said outer race being formed about said inner race.

19. The bearing as in claim 18, wherein said self lubricating machinable liner is a fabric composite self lubricating bearing material woven with fillers and is adhesively bonded to either said inner race or said outer race by a resin and said first and second channels are machined into said self lubricating liner after said resin cures.

20. The bearing as in claim 19, wherein said first channel is in fluid communication with said second channel and said first and second channels are angularly displaced with respect to each other.

21. The bearing as in claim 20, wherein said second channel comprises a plurality of channels each being angularly displaced with respect to said first channel and each being in fluid communication with said first channel.

22. The bearing as in claim 21, wherein said plurality of channels are orthogonally positioned with respect to said first channel.

23. The bearing as in claim 22, wherein said plurality of channels and said first channel are configured to receive and retain an amount of lubricating grease for providing a lubricating means for a first range of movements of said bearing.

24. The bearing as in claim 23, further comprising at least one o-ring disposed between said first member and said second member.

25. The bearing as in claim 23, wherein said self lubricating machineable liner provides a lubricating means for a second range of movements of said bearing, said second range of movements being more frequent that said first range and encompassing a lesser range of movement between said first member and said second member.

* * * * *